United States Patent [19]
Waters et al.

[11] Patent Number: 5,109,676
[45] Date of Patent: May 5, 1992

[54] VAPOR CYCLE SYSTEM EVAPORATOR CONTROL

[75] Inventors: Peter D. Waters, San Diego, Calif.; John F. Defenbaugh; Eric A. Henderson, both of Rockford, Ill.; Robert G. Glass, Loves Park, Ill.

[73] Assignee: Sundstrand Corporation, Rockford, Ill.

[21] Appl. No.: 550,631

[22] Filed: Jul. 10, 1990

[51] Int. Cl.$^5$ .............................................. F25B 5/00
[52] U.S. Cl. ...................................... 62/117; 62/197; 62/223
[58] Field of Search .................. 62/117, 205, 211, 223, 62/201, 197

[56] References Cited

U.S. PATENT DOCUMENTS

| | | | |
|---|---|---|---|
| 2,684,578 | 7/1954 | Hieatt et al. | 62/197 |
| 4,112,703 | 9/1978 | Kountz | 62/211 |
| 4,658,596 | 4/1987 | Kuwahara | 62/197 |
| 4,745,767 | 5/1988 | Ohya et al. | 62/211 |
| 4,845,956 | 7/1989 | Berntsen et al. | 62/225 |
| 4,848,099 | 7/1989 | Beckey et al. | 62/212 |
| 4,856,286 | 8/1989 | Sulfstede et al. | 62/89 |

OTHER PUBLICATIONS

"A New Technology in Energy-Efficient Electrically Driven Aircraft Environmental Control Systems" authored by W. Cloud, J. McNamara and David B. Wigmore, presented at the 21st IECEC Conference, Aug. 25-29, 1986, Article #869390 American Chemical Society, pp. 1696-1702.

*Primary Examiner*—William E. Wayner
*Attorney, Agent, or Firm*—Antonelli, Terry, Stout & Kraus

[57] ABSTRACT

A refrigeration system which may be operated to control superheat at an inlet to a compressor (12) to produce a controlled superheat or to control a temperature of a fluid cooled by at least one evaporator (68) to provide the cooled fluid at a set temperature by controlling an opening of at least one expansion valve (62) in accordance with the invention includes a temperature control (206) which is activable to control the at least one expansion valve to cool the fluid to a set temperature in response to an enabling signal; a superheat control (208) which is activable to control the at least one expansion valve to control the superheat at the inlet of the compressor in response to an enabling signal; and a controller (204) responsive to the at least one logic operational state of the refrigeration system, for generating one of the enabling signals to activate one of the temperature control or the superheat control to control the at least one expansion valve to control superheat or provide cooled fluid at the set temperature.

38 Claims, 2 Drawing Sheets

VAPOR CYCLE SYSTEM EVAPORATOR CONTROL

CROSS-REFERENCE TO RELATED APPLICATIONS

Reference is made to patent application Ser. No. 401,866, entitled "Vapor Cycle System With Multiple Evaporator Load Control and Superheat Control", filed on Sep. 1, 1989, which is assigned to the Assignee of the present invention which application is incorporated herein by reference in its entirety; and to Patent application Ser. No. 527,869, entitled "Operating Mode Transition Design For An Environmental Control System", filed on May 24, 1990, which is assigned to the Assignee of the present invention, which application is incorporated herein by reference in its entirety; and to Patent application Ser. No. 550,544, entitled "Bearing Pump Control for Lubricating Hydrodynamic Compressor Bearings" filed on even date herewith which is assigned to the Assignee of the present invention, which application is incorporated by reference in its entirety; and to Patent application Ser. No. 550,867 entitled "Superheat Sensor With Single Coupling to Fluid Line", filed on even date herewith which is assigned to the Assignee of the present invention, which application is incorporated by reference in its entirety; and to Patent application Ser. No. 550,433 entitled "Vapor Cycle Cooling System Having a Compressor Rotor Supported With Hydrodynamic Compressor Bearings", filed on even date herewith, which is assigned to the Assignee of the present application, which application is incorporated herein by reference in its entirety; and to, Patent application Ser. No. 550,506 entitled "Hydrodynamic Bearing Protection System and Method", filed on even date herewith, which is assigned to the Assignee of the present invention, which application is incorporated herein by reference in its entirety; and to Patent application Ser. No. 550,631 entitled "Speed Control of a Variable Speed Aircraft Vapor Cycle Cooling System Condenser Fan and Compressor and Method of operation", filed on even date herewith, which is assigned to the Assignee of the present invention, which application is incorporated herein by reference in its entirety; and to Patent application Ser. No. 550,434 entitled "Control System For Controlling Surge As a Function of Pressure Oscillations and Method", filed on even date herewith, which is assigned to the Assignee of the present invention, which application is incorporated herein by reference in its entirety; and to Patent application Ser. No. 550,432 entitled "Refrigeration System With Oiless Compressor Supported By Hydrodynamic Bearings With Multiple Operation Modes and Method of Operation", filed on even date herewith, which is assigned to the Assignee of the present invention, which application is incorporated herein by reference in its entirety.

TECHNICAL FIELD

The present invention relates to refrigeration systems which are operable to control superheat at an inlet to a compressor to produce a controlled superheat or to control a temperature of a cooled fluid cooled by at least one evaporator to provide the cooled fluid at a set temperature by controlling an opening of at least one expansion valve.

BACKGROUND ART

The superheat is defined as the difference between a temperature of a vapor and the dewpoint temperature of the vapor. In refrigeration systems, it is necessary to provide a superheated fluid to the inlet of a compressor to avoid damage to the compressor. Refrigeration systems are typically designed to provide superheated fluid at the inlet of a compressor which has a superheat of at least several degrees above the dewpoint temperature during operation of the refrigeration system to avoid liquid refrigerant from being provided to the inlet of the compressor during variation of the operating conditions of the system such as changing the opening of an expansion valve providing expanded refrigerant to the evaporator.

Refrigeration systems are typically operated to provide superheat control by either controlling the opening of the expansion valve or the velocity of the compressor to regulate the temperature of the refrigerant being provided to the inlet of the compressor. U.S. patent application Ser. No. 401,866, entitled "Vapor Cycle System With Multiple Evaporator Load Control and Superheat Control", filed on Sep. 1, 1989, which is assigned to the assignee of the present invention discloses a refrigeration system which controls multiple evaporators at different set temperatures with superheat control being provided by regulation of compressor velocity.

Operation of refrigeration control systems to provide cooling of a fluid by an evaporator at a set temperature is known. These systems control the opening of an expansion valve providing expanded refrigerant to the evaporator by computing the difference between the sensed temperature of the cooled fluid and a set point temperature and generating an expansion valve control signal proportional to the difference.

Operation of refrigeration systems to provide a controlled superheat by controlling the opening of an expansion valve is also known. These systems compare the temperature of the refrigerant which is discharged from the evaporator to a set temperature and regulate the opening of the expansion valve to maintain the temperature of the refrigerant entering the compressor within a temperature range typically of several degrees above the dewpoint temperature to prevent liquid refrigerant from being inputted to the compressor which can cause severe damage to the compressor. Inputting of substantial liquid refrigerant into a compressor, especially rotary compressors which run at high rotational velocities, can cause severe damage or destroy the rotor of the compressor.

U.S. Pat. No. 4,112,703 discloses a refrigeration control system in which the temperature of a fluid cooled by the evaporator is maintained at a set point by adjusting the refrigerant temperature at the evaporator outlet in the refrigeration system. The opening of a solenoid controlled expansion valve is controlled by the difference in temperature of the cooled fluid at the outlet of the evaporator and a set temperature which is the desired temperature to control the opening of the expansion valve. The refrigeration system of the '703 patent also controls the temperature of the refrigerant inputted into the compressor to maintain a controlled superheat to avoid liquid refrigerant from being inputted to the compressor. Superheat control is maintained in the '703 patent by comparing the outlet temperature of the evaporator to a set temperature and closing the valve as long as the evaporator temperature is below the set temperature. When the outlet temperature falls below the set temperature, the output of a comparator changes level to cause the solenoid expansion valve to be closed to raise the superheat.

The control of the '703 patent is not controlled by digital logic which limits the parameters of control which are used in controlling the operation of the refrigeration system to provide a controlled set point temperature at the evaporator and a control of superheat. Furthermore, the '703 patent does not provide independent control of superheat and a set point temperature at the evaporator. Operation of the control of the evaporator temperature at a set point is disabled when superheat drops below the minimum level. Superheat control in the '703 patent is controlled only as a function of the temperature at the outlet of the evaporator which limits the degree of control which the system may exercise.

Sophisticated refrigeration systems such as those used in airframes require a number of control parameters to provide the desired system operation. These control parameters are used to limit energy consumption by the system and to provide flexible control for regulating the heat load at a set point temperature. Moreover, it is desirable to operate multiple evaporators at different temperatures to provide control of different heat loads at different set point temperatures. On the other hand, control systems such as disclosed in the '703 patent, which are intended for operation in environments which do not require the sophistication of control found in airframes, do not utilize multiple control parameters including providing control of superheat by varying compressor velocity and control of the heat load at a set point by varying the opening of one or more expansion valves.

DISCLOSURE OF INVENTION

The present invention provides a refrigeration system and method of operating a refrigeration system in which superheat at an inlet to a compressor is controlled or a temperature of a fluid cooled by at least one evaporator is controlled to provide cooled fluid at a set temperature by controlling an opening of at least one expansion valve in response to at least one logic operational state of the refrigeration system. The at least one logic operational state of the refrigeration system is generated in response by sensing at least one sensed condition of operation of the system. With the invention when the at least one expansion valve is controlled to produce cooled fluid at a set temperature, superheat at the inlet to the compressor is produced by control of the compressor velocity. As a result, dual superheat control and control of the set point of cooled fluid provided by the evaporator is achieved during normal operation of the system. Furthermore, the ability to control the expansion valve to provide superheat control or temperature control may be used for start-up of the system to permit the system to come up to velocity by closing the at least one expansion valve and to provide control for operation outside normal operation at a set point temperature.

A controller, which is responsive to at least one logic operational state of the refrigeration system, generates enabling signals to activate either a temperature control or a superheat control during operation of the system. The temperature control is activable to control the at least one expansion valve to cool the fluid to a set temperature in response to an enabling signal. The superheat control is activable to control the at least one expansion valve to control the superheat at the inlet of the compressor in response to an enabling signal. The at least one logic operational state of the refrigeration system which controls the generating of the enabling signals to activate the temperature control and the superheat control is produced by a combinatorial logic circuit which provides for system operation in response to multiple sensed operational conditions of the refrigeration system.

The controller specifies operation of the refrigeration system under control of the superheat control when a rotational velocity of the compressor exceeds a set rotational velocity and a temperature of the fluid cooled by the at least one evaporator is greater than the set temperature or operation of the system to control the at least one expansion valve to control superheat at the inlet of the compressor has been specified by a logic operational state in response to at least one sensed condition of the operation of the refrigeration system or a motor control controlling a rotational velocity of the compressor drawing current exceeding a maximum current which may be drawn which causes the motor control to command a reduced rotational velocity. The velocity of the compressor is regulated by a motor velocity control during operation of the system to control the opening of at least one expansion valve to produce a set temperature of at least one fluid cooled by at least one evaporator temperature control.

A refrigeration system which may be operated to control superheat at an inlet to a compressor to produce a controlled superheat or to control a temperature of a fluid cooled by at least one evaporator to provide the cooled fluid at a set temperature by controlling an opening of at least one expansion valve in accordance with the invention includes a temperature control which is activable to control the at least one expansion valve to cool the fluid to a set temperature in response to an enabling signal; a superheat control which is activable to control the at least one expansion valve to control the superheat at the inlet of the compressor in response to an enabling signal; and a controller, responsive to the at least one logic operational state of the refrigeration system including a logic operational state of the compressor, for generating one of the enabling signals to activate one of the temperature control or the superheat control to control the at least one expansion valve to control superheat or provide cooled fluid at the set temperature. The controller generates the enabling signals in response to at least one operational logic state by sensing at least one sensed condition of operation of the system. The sensed conditions comprise rotational velocity of the compressor, a temperature of fluid cooled by an evaporator and current drawn by the motor control controlling velocity of rotation of the compressor and the plurality of operational logic states comprise when the sensed rotational velocity is greater than a set rotational velocity, the temperature of the fluid after cooling by the evaporator is greater than the set temperature, operation of the refrigeration system is set to control the at least one expansion valve to control superheat at the inlet of the compressor and current drawn by the motor control circuit is greater than a set maximum current which may be drawn during operation. The controller controls a rotational velocity of the compressor to maintain the controlled superheat when the opening of the at least one expansion valve is controlled to maintain the cooled fluid at the set temperature.

The invention further includes a control having an output state, which occurs in response to sensed conditions of operation of the system, providing the logic operational states setting operation of the system to control superheat. The output state of the control specifying operation of the system to control superheat is a function of a sensed ambient temperature and a sensed temperature of fluid cooled by the evaporator with the preferred condition being that the sensed ambient temperature is equal to or greater than the sensed temperature of fluid cooled by the evaporator.

A method of controlling a refrigeration system which may be operated to control superheat at an inlet to a compressor to produce a controlled superheat or to control a temperature of a fluid cooled by at least one evaporator to provide the cooled fluid at a set temperature by controlling an opening of the at least one expansion valve in accordance with the invention includes sensing operation of the refrigeration system including a logic operational state of the compressor and in response to the sensed operation generating at least one logic operational state; and controlling operation of the refrigeration system to produce a controlled superheat or the cooled fluid at a set temperature respectively in response to first and second logic states produced in response to the at least one logic operation state to control the at least one expansion valve to control superheat or provide cooled fluid at the set temperature. A rotational velocity of the compressor is controlled to maintain the controlled superheat when the opening of the at least one expansion valve is controlled to maintain the cooled fluid at the set temperature. The refrigeration system operates to control superheat with the at least one expansion valve when a rotational velocity of the compressor exceeds a set rotational velocity and a temperature of fluid cooled by the at least one evaporator is greater than a set temperature; or the refrigeration system operates to control superheat with the at least one expansion valve when operation of the system to control the at least one expansion valve to control superheat at the inlet of the compressor has been specified by a logic operational state in response to a sensed condition of operation of the refrigeration system; or the refrigeration system operates to control superheat with the at least one expansion valve when a motor control controlling a rotational velocity of the compressor draws current exceeding a maximum current which may be drawn during operation which causes the motor control to command a reduced rotational velocity.

BEST MODE FOR CARRYING OUT THE INVENTION

Figure 1:
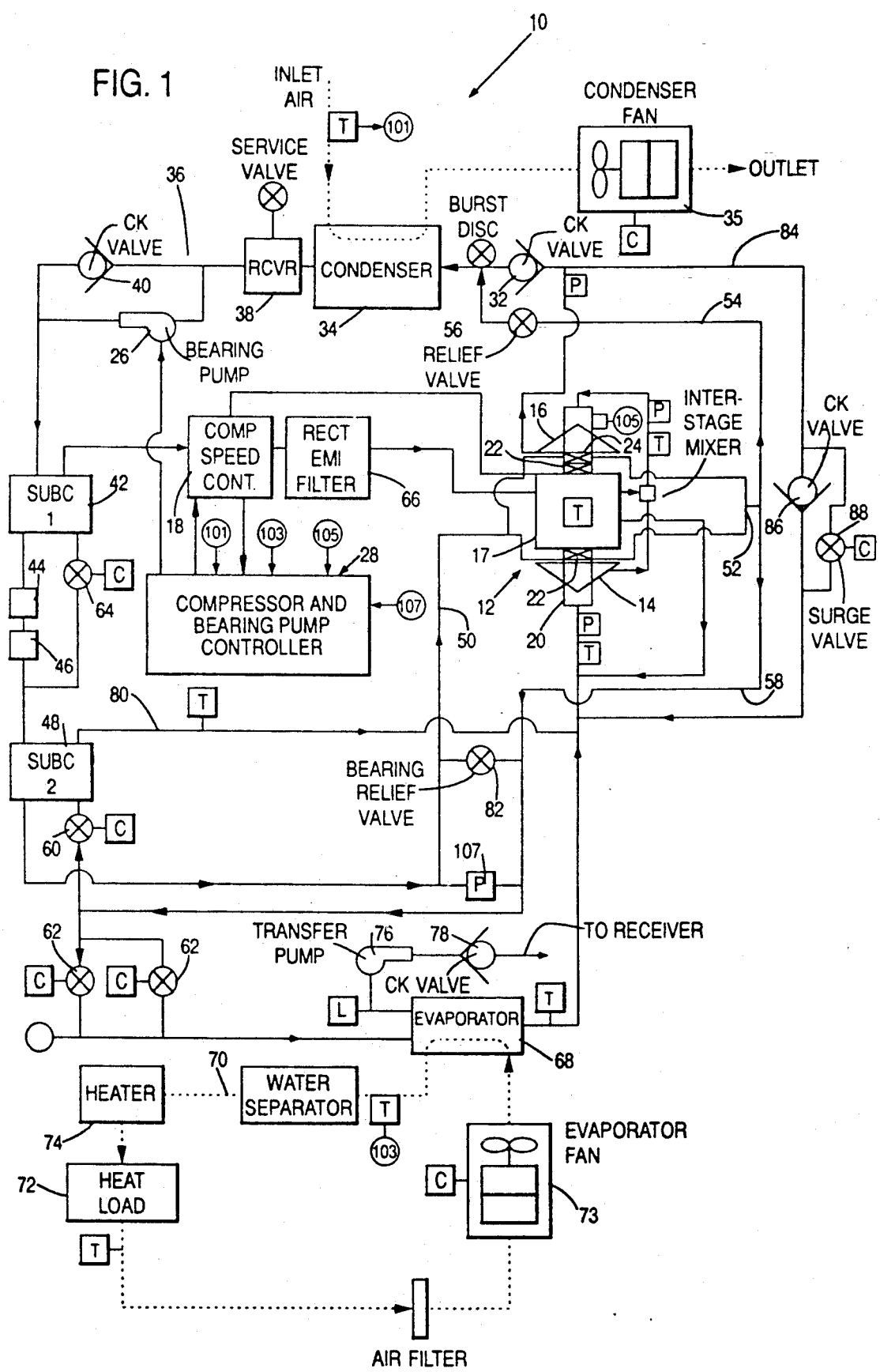
FIG. 1 illustrates a block diagram of a refrigeration system in which the present invention is utilized.

The present invention provides a refrigeration system which may be operated to control superheat at an inlet to a compressor to produce a controlled superheat or to control a temperature of a fluid cooled by at least one evaporator to provide the cooled fluid at a set temperature by controlling an opening of at least one expansion valve during operation of the refrigeration system. Furthermore in accordance with the present invention, the rotational velocity of a compressor is varied to control the superheat at the inlet to the compressor when the expansion valve is used to control the temperature of the fluid cooled by the at least one evaporator. A plurality of conditions of operation of the refrigeration system are sensed and processed by a combinatorial logic circuit to produce enabling signals to activate a superheat control which is activable to control at least one expansion valve to control the superheat at the inlet of the compressor in response to an enabling signal or to activate a temperature control which is activable to control the at least one expansion valve to cool the fluid to a set temperature. Control by the combinatorial logic circuit provides the ability to process a plurality of sensed conditions of operation of the refrigeration system to provide a sophisticated control of the refrigeration system for applications, such as airframes, to provide an energy efficient and highly controlled system.

A preferred application of the refrigeration system 10 is cooling avionics on an airframe. While the invention is not limited thereto, the system of FIG. 1 utilizes a non-azeotropic binary refrigeration fluid. A centrifugal compressor is comprised of two compressor stages 14 and 16 which are driven by a high-velocity electrical motor 17 that runs at a rotational velocity of up to 70,000 rpm. The motor 17 is driven by a velocity control 18 of the type described in U.S. patent application Ser. Nos. 319,719, 319,727 and 320,224, which are assigned to the Assignee of the present invention. The rotor on which the compressor stages 14 and 16 are mounted is supported by the aforementioned pair of hydrodynamic radial bearings 22 and a hydrodynamic thrust bearing 24. A hydrodynamic bearing, which is well known, separates surfaces moving relative to each other with a lubricant which is pressurized from a pressure source. The structure of the hydrodynamic radial and thrust bearings 22 and 24 is not illustrated for the reason that it is conventional and does not form part of the present invention.

The hydrodynamic radial and thrust bearings 22 and 24 are maintained by pressurized oiless liquid state refrigerant which is provided from two sources. The first source is from the second stage 16 of the compressor 12 and the second source is from the bearing pump 26 which is activated by the compressor and bearing pump controller 28 in accordance with predetermined conditions of operation of the refrigeration system which are based upon sensed operational parameters as described below. The function of the bearing pump 26 is to make up for a deficiency in the pressure and quantity of refrigerant outputted from the second stage 16 of the compressor 12 which is necessary to maintain the hydrodynamic radial and thrust bearings 22 and 24 during predetermined operational conditions of the refrigeration system 10 and is the only source of pressurized refrigerant during an economy mode in which the compressor is not operated. The bearing pump outputs pressurized refrigerant at a pressure higher than the output pressure of the second stage 16 of the compressor 12 when the compressor and bearing pump 26 is activated by the compressor and bearing pump controller 28.

The flow of refrigerant through the refrigeration system 10 is described as follows: Pressure and temperature transducers which are located at various points in the system, are identified by a square box respectively containing the letters "P" and "T". Control signals applied to controllable expansion valves which are provided from the compressor and bearing pump controller 28 are identified by a square box labelled with the letter "C". A square box containing the letter "L" is a liquid level sensor providing a signal to the compressor and bearing pump controller 28. The connections of the liquid level sensor and pressure and temperature transducers to the compressor and bearing pump controller 28 have been omitted for purposes of clarity in the drawings. Pressurized refrigerant flows from the second stage 16 of the compressor 12 through check valve 32 to condenser 34 at which the pressurized refrigerant gas is condensed to liquid. A first heat exchange fluid, which in this application is air, but the invention is not limited thereto, flows in a counterflow direction through the condenser 34 under suction created by a condenser fan 35 to remove heat from the refrigerant and cause the refrigerant to condense to liquid. The refrigerant is outputted by the condenser 32 to a refrigerant circuit 36 which couples the condenser to the radial and thrust hydrodynamic bearings 22 and 24 through a flow path including receiver 38, check valve 40, a first subcooler 42, filter dryer 44, sight glass 46, a second subcooler 48 and from the output of the second subcooler 48 through line 50 to the input to the radial and thrust hydrodynamic bearings 22 and 24. The liquid refrigerant discharged from the radial and hydrodynamic bearings 22 and 24 is combined at point 52. The liquid refrigerant flows from point 52 in a first path 54 when the relief valve 56 is opened to the input of the condenser 34 and through a second path 58 to an expansion valve 60 and, while the invention is not limited thereto, to a pair of parallel connecting expansion valves 62. The relief valve 56 is opened when the valves 60 and 62 are closed.

The subcooler 42 functions to cool liquid refrigerant outputted by the receiver 38 to a temperature determined by expansion valve 64 which controls the superheat at the inlet of the second stage 16 of the compressor 12. The expanded refrigerant outputted by the expansion valve 64 cools the liquid refrigerant flowing into the subcooler 42. The liquid refrigerant flowing from the subcooler 42 cools the electronics contained in the compressor velocity control 18 and the electronics contained in the rectifier and EMI filter 66 which are components used for driving the electrical motor 17.

The expansion valves 60 and 62 perform different functions. The expansion valve 60 controls the superheat at the output of the subcooler 48. The expansion valves 62 may perform one of two functions. The first function is the controlling of the superheat out of the evaporator 68 which cools air flowing in a direction counter to the flow of refrigerant through the evaporator in an airflow path 70 which cools an avionics heat load 72. The second function of the expansion valves is the control of the air temperature out of the evaporator. Only one expansion valve control function may be performed at a time with activation of these control functions being described below in conjunction with FIG. 2. Fan 73 provides the pressure head to cause air to circulate in the airflow path 70. Optionally, a heater 74, which may have multiple stages, but is not limited thereto, may be provided in the airpath 70 when cooling of the heat load 72 which may be avionics is not necessary. The evaporator 68 is coupled to the receiver 65 through a transfer pump 76 and a check valve 78.

A function of the second subcooler 48 pertinent to this embodiment of the invention is to lower the temperature of liquid refrigerant flowing out of the first subcooler to a temperature at which the refrigerant will maintain a liquid state flowing through the hydrodynamic radial and thrust bearings 22 and 24 after absorbing heat therein. The cold side output 80 from the second subcooler 48 combines with the output from the evaporator 68 and supplies the input to the first stage 14 and the compressor.

A bearing relief valve 82 bypasses the hydrodynamic radial and thrust bearings 22 and 24 when the pressure across the bearings reaches a predetermined maximum pressure, such as 50 psi, to avoid dropping excessive pressure across the hydrodynamic radial and thrust bearings 22 and 24 which may damage the bearings. A $\Delta P$ pressure transducer 107 senses when the pressure drop across the radial and thrust bearings 22 and 24 is less than 18 psi. The function of the $\Delta P$ pressure transducer 107 is described in U.S. patent application Ser. No. 550,544 entitled "Bearing Pump Control For Lubricating Hydrodynamic Compressor Bearings".

The output from the second stage 16 of the compressor may flow through a fluid circuit 84 which contains a parallel connection of a check valve 86 and a surge valve 88. These valves permit recirculation of refrigerant from the output stage 16 back to the input stage of the compressor during surge conditions in a manner which is well-known. The control of the surge valve 88 is disclosed in patent application Ser. No. 550,434 entitled "Control System For Controlling Surge As A Function of Pressure Oscillations and Method" filed on even date herewith.

One of the functions of the bearing pump 26 is to provide supplemental pressurized refrigerant to the hydrodynamic radial and thrust bearings 22 and 24 under conditions of operation of the compressor 12 where the output pressure from the second stage is insufficient to maintain the necessary minimum pressure and flow rate to the hydrodynamic radial and thrust bearings. The compressor and bearing pump controller 28 activates the bearing pump 26 in accordance with predetermined conditions of operation of the refrigeration circuit 10 as described in detail in U.S. patent application Ser. No. 550,544 entitled "Bearing Pump Control For Lubricating Hydrodynamic Compressor Bearings", filed on even date herewith. The activation of the bearing pump 26 is controlled by the compressor and bearing pump controller 28 as a function of temperatures sensed by temperature sensors 101 and 103 which respectively sense the temperature Tsink of the heat exchange fluid at the condenser 34 and the temperature Tsource of the heat exchange fluid at the evaporator 68, the velocity of rotation of the rotor 20 as sensed by velocity sensor 105 and the pressure drop across the hydrodynamic bearings 22 and 24 as sensed by $\Delta P$ sensor 107. The compressor and bearing pump controller 28 is responsive to the current drawn by the compressor speed control 18 in powering the motor 17. When the magnitude of current drawn by the compressor speed control 18 exceeds a set maximum current which may be drawn during operation, the compressor and bearing pump controller 28 generates a high level logic operational state as explained below with reference to FIG. 2.

Figure 2:
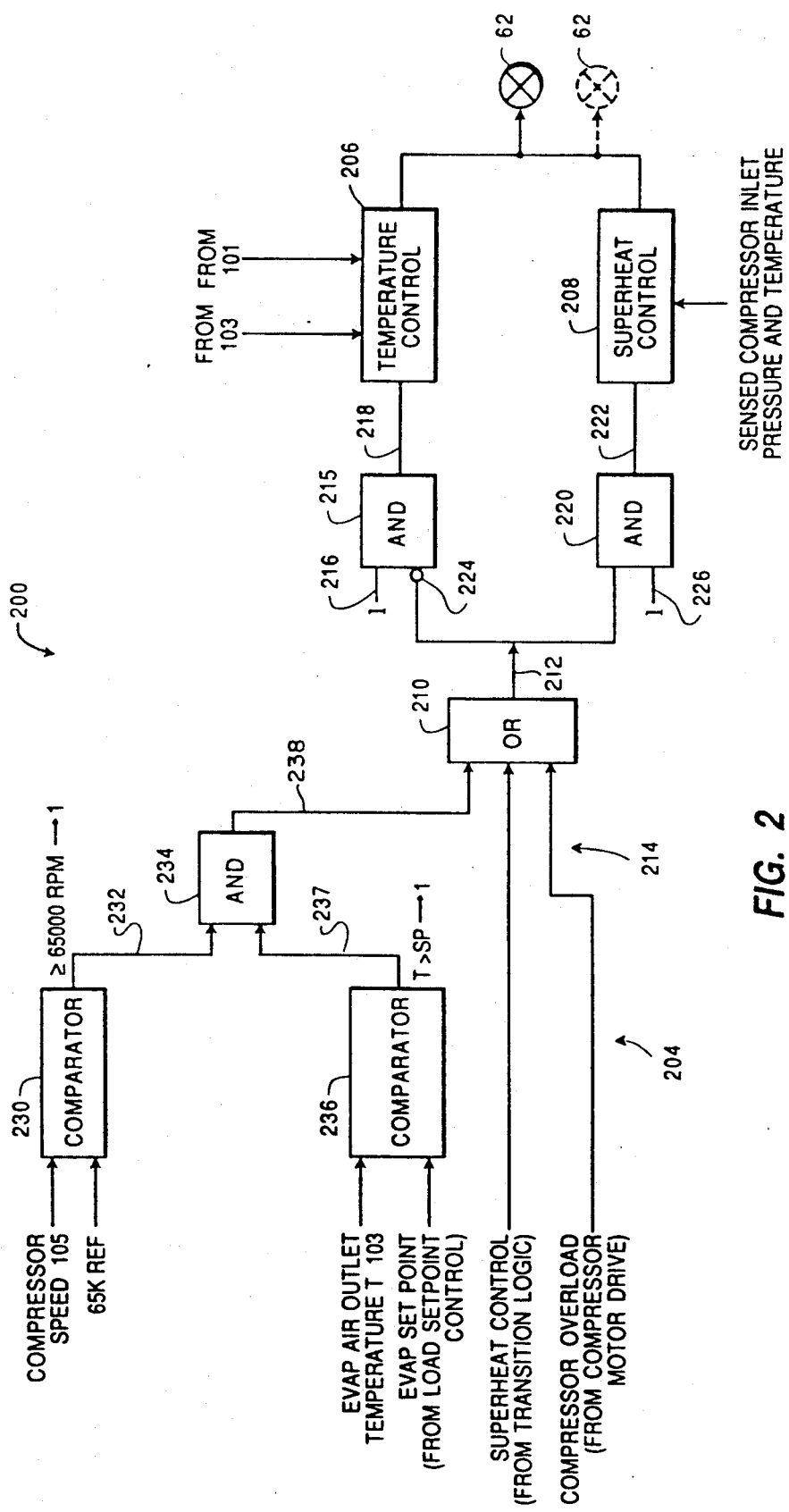
FIG. 2 illustrates a block diagram of the present invention.

FIG. 2 illustrates a block diagram of a refrigeration system control in accordance with the present invention. Like reference numerals identify like parts in FIGS. 1 and 2. The control system 200 of FIG. 2 uses a combinatorial logic circuit 204 which is responsive to a plurality of sensed conditions of operation of the refrigeration system to generate a plurality of operational logic states having one of two binary levels which are processed to generate enabling signals controlling the activation of temperature control 206 or superheat control 208 to control at least one expansion valve 62 to respectively control the temperature of fluid cooled by the evaporator to a set temperature or to provide a controlled superheat. When a controlled superheat is to be produced by controlling the at least one expansion valve 62, the compressor and bearing pump controller 28 in conjunction with the compressor velocity control 18 functions to control the rotational velocity of the rotor 20 of the compressor 12 to provide simultaneous control of the temperature of fluid controlled by the evaporator and superheat. The temperature control 206 is conventional and may be responsive to the temperature of the cooled fluid outputted by the evaporator, the ambient temperature and a set temperature at which delivery of the cooled fluid from the evaporator is desired. The superheat control 208 is conventional and may be responsive to a sensed compressor inlet pressure and temperature used for calculating the superheat of the particular refrigerant utilized in the system and a set superheat which may be a range of temperatures defining the desired superheat for safe operation of the compressor to avoid the introduction of liquid into the inlet of the compressor.

A controller which includes the combinatorial logic circuit 204 is described as follows. OR gate 210 generates a high and a low level output logic states on output 212 in response to a plurality of low and high logic states on inputs 214. A low level output logic state on output 212 from OR gate 210 functions as an enabling signal which enables the temperature control 206 to control the at least one expansion valve 62 to control a set point of cooled fluid provided by at least one evaporator such as evaporator 68 of FIG. 1. AND gate 215, which has a first high level logic state on input 216, produces a high level output logic state on output 218 in response to a low level output logic state on output 212 of OR gate 210 applied to an inverting input of the AND gate which functions as an enabling signal to enable the temperature control 206. It should be noted that the enabling signals are not limited to being respectively high and low level logic levels produced by a single logic gate and may be separate signals having the same logic level. AND gate 220 enables the superheat control 208 when a high level logic state is produced on output 222 in response to a high level logic state on output 212 of OR gate 210. A high logic level state on output 212 of OR gate 210 and a high level logic state on input 226 insures that the superheat control 208 is turned on when the temperature control 206 is not enabled and is turned on when the temperature control 206 is enabled.

The combinatorial logic circuit 204 provides the inputs 214 to the OR gate 210 for controlling the activation of either the temperature control 206 or the superheat control 208 to control the at least one expansion valve 62 to provide control of either the temperature of a fluid cooled by the at least one evaporator or the superheat at the inlet to the compressor. The compressor velocity 105 is applied as a first input to a comparator 230. A second input to comparator 230 is a 65,000 rpm reference velocity. The output 232 from the comparator 230 assumes one of two logic operational states. The low level operational logic state occurs when the compressor velocity is less than the 65,000 rpm reference velocity. The high level logic operational state occurs when the compressor velocity is equal to or greater than the 65,000 rpm reference velocity. The output 232 from the comparator 230 is applied as an input to AND gate 234 which has a second input which is an output 237 from comparator 236. The comparator 236 has a first input from the temperature sensor 103 sensing the temperature of the fluid cooled by the at least one evaporator 68 and a second input which is the desired set point temperature of the fluid cooled by the evaporator 68. The output 237 of comparator 236 is a high level logic operational state when the sensed temperature is greater than the set point temperature. When the output 238 of the AND gate 236 is a high level logic operational state, the output 212 of the OR gate is a high level logic operational state which causes the system to operate in controlling the at least one expansion valve 62 under the operation of the superheat control 208. Operation of the compressor at a rotational velocity above 65,000 rpm as indicated by the output 232 of the comparator 230 going high and operation of the refrigeration system to produce fluid with a temperature which is greater than the set point temperature signifies a logic operational state in which the refrigeration system may not be safely operated with the at least one expansion valve 62 controlling the set point temperature with superheat control being provided by the superheat control 208. A logic operational state from the superheat control which is an input to OR gate 210 having a high level signifies that the compressor and bearing pump controller 28 has specified operation of the system to use the superheat control 208 to control superheat. If the compressor and bearing pump controller 28 has specified that the expansion valve 62 is to be operated to control superheat, the signal state from the superheat control which is an input to the OR gate 210 is high and if the compressor and bearing pump controller has not specified that the at least one expansion valve 62 is to be used exclusively for controlling superheat then the signal state from the superheat control of the compressor and bearing pump controller 28 is low which does not cause the output 212 of the OR gate 210 to go high to activate the temperature control 206 to control the at least one expansion valve 62 to control the set temperature. During start-up, the superheat control signal states of the compressor and bearing pump controller 28 which are an input to OR gate 210 may be produced by a comparison of the evaporator and ambient temperatures with the signal state being high when the ambient temperature is less than the sensed temperature of the fluid cooled by the at least one evaporator 68 and the signal state being low when the ambient temperature is equal to or greater than the sensed temperature of the fluid cooled by the evaporator. However, it should be understood that the generation of the signal states from the superheat control logic within the compressor and bearing pump controller 28 may be generated in response to other sensed conditions of operation of the refrigeration system. The compressor overload input 214 to the OR gate 210 has a high level logic operational state when a sensed current drawn by the motor control 18 exceeds a maximum current which may be drawn during operation without damaging the power electronics and a low level logic operational state when the sensed current is below the maximum current at which the motor control may be operated without damage. When a compressor current overload occurs, a decrease in power applied to the compressor 12 is required to protect the electronics in the motor control 18. Therefore, operation to control a set temperature at the at least one evaporator 68 may not be safely performed. When any of the inputs 214 to the OR gate 210 is high, the output 212 commands the activation of the superheat control 208 in response to an enabling signal produced by the OR gate and the AND gate 220. When all of the inputs 214 to the OR gate 210 are low, the output 212 is low with the output 218 of AND gate 215 being high to produce an enabling signal by the OR gate and AND gate 215 activating the temperature control 208 to control the at least one expansion valve 62 to control the set temperature. When the output 212 of the OR gate 210 is high, which causes the superheat control 208 to control the at least one expansion valve 62 to produce controlled superheat from the at least one evaporator 68, the compressor and bearing pump controller 28 and compressor velocity control 17 do not operate to control the rotational velocity of the compressor 12 to produce a controlled superheat.

With respect to FIG. 2, the sensed conditions of operation of the refrigeration system 10 which are processed by the combinatorial logic circuit 204 comprise the rotational velocity of the compressor sensed by sensor 105, the temperature of the fluid cooled by the at least one evaporator 68 and the current drawn by the operation of the motor control 17 controlling the velocity of rotation of the compressor. The plurality of operational logic states of the combinatorial logic circuit 204 comprise when the sensed rotational velocity is greater than a set rotational velocity, the temperature of the fluid cooled by the at least one evaporator 68 is greater than the set temperature, operation of the refrigeration system is set to control the at least one expansion valve 62 to control superheat at the inlet of the compressor and current drawn by the operation of the motor control 17 is greater than a maximum current which may be drawn during operation.

A method of operating a refrigeration system which may be operated to control superheat at an inlet to a compressor to produce a controlled superheat or to control a temperature of a fluid cooled by at least one evaporator to provide the cooled fluid at a set temperature by controlling an opening of at least one expansion valve includes sensing operation of the refrigeration system and in response to the sensed operation generating at least one logic operational state which includes the outputs 232 and 237 of the comparators 230 and 236, respectively, the output 238 of the AND gate 234 and the inputs to the OR gate 210 from the superheat control and compressor overload for controlling operation of the refrigeration system to produce a controlled superheat or the fluid at the set temperature, respectively, in response to first and second logic states in response to the at least one logic operation state to control the at least one expansion valve to control superheat or provide cooled fluid at the set temperature. The refrigeration system operates to control superheat by control of the at least one expansion valve 62 when a rotational velocity of the compressor 12 exceeds a set rotational velocity and a temperature of fluid cooled by the at least one evaporator 68 is greater than a set temperature; or the refrigeration system operates to control superheat by control of the at least one expansion valve 62 when operation of the system to control the at least one expansion valve 68 to control superheat at the inlet of the compressor 12 has been specified by a logic operational state in response to at least one sensed condition of operation of the refrigeration system; or the refrigeration system operates to control superheat by control of the at least one expansion valve 62 when a motor control 17 controlling a rotational velocity of the compressor draws current exceeding a maximum current which may be drawn during operation that causes the motor control to command a reduced rotational velocity.

While a preferred application of the invention is in an airframe refrigeration system as illustrated in FIG. 1, it should be understood that the invention may be practiced in other fields of application. Moreover, while the system of FIG. 1 is illustrate as having a single evaporator 68 which operates to cool fluid to a set temperature when the temperature control 206 is activated, it should be understood that the invention is applicable to controlling multiple evaporators by controlling multiple expansion valves with the different evaporators having different set points at which cooled fluid is to be produced by the evaporator 68. While the invention has been described in terms of its preferred embodiment, it should be understood that numerous modifications may be made thereto without departing from the spirit and scope of the invention as defined in the appended claims. It is intended that all such modifications fall within the scope of the appended claims.

We claim:

1. A refrigeration system which may be operated to control superheat at an inlet to a compressor to produce a controlled superheat or to control a temperature of a fluid cooled by at least one evaporator to provide the cooled fluid at a set temperature by controlling an opening of at least one expansion valve comprising:

a temperature control which is activable to control the at least one expansion valve to cool the fluid to a set temperature in response to an enabling signal;

a superheat control which is activable to control the at least one expansion valve to control the superheat at the inlet of the compressor in response to an enabling signal; and a controller, responsive to at least one logic operational state of the refrigeration system including a logic operational state of the compressor, for generating one of the enabling signals to activate one of the temperature control or the superheat control to control the at least one expansion valve to control superheat or provide cooled fluid at the set temperature.

2. A refrigeration system in accordance with claim 1 wherein:

the controller generates the enabling signals in response to at least one operational logic state by sensing at least one sensed condition of operation of the system.

3. A refrigeration system in accordance with claim 2 wherein:

the sensed condition is a rotational velocity of the compressor and one of the at least one logic operational state is that the sensed rotational velocity is greater than a set rotational velocity.

4. A refrigeration system in accordance with claim 2 wherein:

the sensed condition is a temperature of fluid cooled by the at least one evaporator and one of the at least one logic operational state occurs when the temperature of the fluid is greater than a set temperature.

5. A refrigeration system in accordance with claim 2 wherein:

one of the at least one logic operational state is that operation of the refrigeration system is set to control the at least one expansion valve to control superheat at the inlet of the compressor.

6. A refrigeration system in accordance with claim 5 further comprising:
a control having an output state, which occurs in response to sensed conditions of operation of the system, providing the logic operational state setting operation of the system to control superheat.

7. A refrigeration system in accordance with claim 6 wherein:
the output state of the control specifying operation of the system to control superheat is a function of a sensed ambient temperature and a sensed temperature of fluid cooled by the evaporator.

8. A refrigeration system in accordance with claim 7 wherein:
the output state of the control occurs when the sensed ambient temperature is equal to or greater than the sensed temperature of fluid cooled by the evaporator.

9. A refrigeration system in accordance with claim 5 wherein:
the controller controls a rotational velocity of the compressor to maintain the controlled superheat when the opening of the at least one expansion valve is controlled to maintain the cooled fluid at the set temperature.

10. A refrigeration system in accordance with claim 2 wherein:
the controller controls a rotational velocity of the compressor to maintain the controlled superheat when the opening of the at least one expansion valve is controlled to maintain the cooled fluid at the set temperature.

11. A refrigeration system in accordance with claim 3 wherein:
the controller controls a rotational velocity of the compressor to maintain the controlled superheat when the opening of the at least one expansion valve is controlled to maintain the cooled fluid at the set temperature.

12. A refrigeration system in accordance with claim 4 wherein:
the controller controls a rotational velocity of the compressor to maintain the controlled superheat when the opening of the at least one expansion valve is controlled to maintain the cooled fluid at the set temperature.

13. A refrigeration system in accordance with claim 2 wherein:
the sensed condition is a condition of operation of a motor control circuit which controls a rotational velocity of the compressor and one of the at least one logic operational state occurs when the condition of operation of a motor control circuit is compared to a set condition of operation of the motor control circuit.

14. A refrigeration system in accordance with claim 13 wherein:
the sensed condition is a function of current drawn by the motor control circuit.

15. A refrigeration system in accordance with claim 14 wherein:
the sensed condition occurs when the current drawn by the motor velocity control is above a set maximum current which may be drawn during operation.

16. A refrigeration system in accordance with claim 1 wherein:
the controller generates the enabling signals in response to a plurality of sensed conditions of operation of the system and a plurality of operational logic states.

17. A refrigeration system in accordance with claim 16 wherein:
the sensed conditions comprise rotational velocity of the compressor, a temperature of fluid cooled by the at least one evaporator and, a current drawn by operation of a motor control circuit controlling velocity of rotation of the compressor; and
the plurality of operational logic states comprise when the sensed rotational velocity is greater than a set rotational velocity, the temperature of the fluid after cooling by the evaporator is greater than the set temperature, operation of the refrigeration system is set to control the at least one expansion valve to control superheat at the inlet of the compressor and a current drawn by operation of the motor control is above a set maximum current which the motor control may drawn during operation.

18. A refrigeration system in accordance with claim 17 further comprising:
a control having an output state, which occurs in response to sensed conditions of operation of the system, providing the logic operational state setting operation of the system to control superheat and wherein;
the logic operational state of the control specifying operation of the system to control superheat is a function of a sensed ambient temperature and a sensed temperature of fluid cooled by the evaporator.

19. A refrigeration system in accordance with claim 18 wherein:
the logic operational state of the control occurs when the sensed ambient temperature is equal to or greater than the sensed temperature of fluid cooled by the evaporator.

20. A refrigeration system in accordance with claim 1 wherein:
the controller specifies operation of the refrigeration system under control of the superheat control when a rotational velocity of the compressor exceeds a set rotational velocity and a temperature of fluid cooled by the at least one evaporator is greater than the set temperature.

21. A refrigeration system in accordance with claim 20 wherein:
the controller controls a rotational velocity of the compressor to maintain the controlled superheat when the opening of the at least one expansion valve is controlled to maintain the cooled fluid at the set temperature.

22. A refrigeration system in accordance with claim 1 wherein:
the controller specifies operation of the system under control of the superheat control when operation of the system to control the at least one expansion valve to control superheat at the inlet of the compressor has been specified by a logic operational state in response to at least one sensed condition of operation of the refrigeration system.

23. A refrigeration system in accordance with claim 22 wherein:
the controller controls a rotational velocity of the compressor to maintain the controlled superheat when the opening of the at least one expansion valve is controlled to maintain the cooled fluid at the set temperature.

24. A refrigeration system in accordance with claim 1 wherein:
the refrigeration system operates to control superheat with the at least one expansion valve when a motor control controlling a rotational velocity of the compressor draws current exceeding a maximum current which may be drawn during operation that causes the motor control to command a reduced rotational velocity.

25. A refrigeration system in accordance with claim 24 wherein:
the controller controls a rotational velocity of the compressor to maintain the controlled superheat when the opening of the at least one expansion valve is controlled to maintain the cooled fluid at the set temperature.

26. A refrigeration system in accordance with claim 1 wherein:
the controller specifies operation of the refrigeration system under control of the superheat control when a rotational velocity of the compressor exceeds a set rotational velocity and a temperature of fluid cooled by the at least one evaporator is greater than the set temperature or
the controller specifies operation of the refrigeration system under control of the superheat control when operation of the system to control the at least one expansion valve to control superheat at the inlet of the compressor has been specified by a logic operational state in response to at least one sensed condition of operation of the refrigeration system, or
the refrigeration system operates to control superheat with the at least one expansion valve when a motor control controlling a rotational velocity of the compressor draws current exceeding a maximum current which may be drawn during operation that causes the motor control to command a reduced rotational velocity.

27. A refrigeration system in accordance with claim 26 wherein:
the controller controls a rotational velocity of the compressor to maintain the controlled superheat when the opening of the at least one expansion valve is controlled to maintain the cooled fluid at the set temperature.

28. A refrigeration system in accordance with claim 1 wherein:
the controller controls a rotational velocity of the compressor to maintain the controlled superheat when the opening of the at least one expansion valve is controlled to maintain the cooled fluid at the set temperature.

29. A method of controlling a refrigeration system which may be operated to control superheat at an inlet to a compressor to produce a controlled superheat or to control a temperature of a fluid cooled by at least one evaporator to provide the cooled fluid at a set temperature by controlling an opening of at least one expansion valve comprising:
sensing operation of the refrigeration system and in response to the sensed operation generating at least one logic operational state including a logic operational state of the compressor; and
controlling operation of the refrigeration system to produce one of a controlled superheat or the fluid at the set temperature respectively in response to first and second logic states produced in response to the at least one logic operation state to control the at least one expansion valve to control superheat or provide cooled fluid at the set temperature.

30. A method in accordance with claim 29 wherein:
a rotational velocity of the compressor is controlled to maintain the controlled superheat when the opening of the at least one expansion valve is controlled to maintain the cooled fluid at the set temperature.

31. A method in accordance with claim 29 wherein:
the refrigeration system operates to control superheat with the at least one expansion valve when a rotational velocity of the compressor exceeds a set rotational velocity and a temperature of fluid cooled by the at least one evaporator is greater than a set temperature.

32. A method in accordance with claim 29 wherein:
the refrigeration system operates to control superheat with the at least one expansion valve when operation of the system to control the at least one expansion valve to control superheat at the inlet of the compressor has been specified by a logic operational state in response to a sensed condition of operation of the system.

33. A method in accordance with claim 29 wherein:
the refrigeration system operates to control superheat with the at least one expansion valve when a motor control controlling a rotational velocity of the compressor draws current exceeding a maximum current which may be drawn during operation that causes the motor control to command a reduced rotational velocity.

34. A method in accordance with claim 29 wherein:
the refrigeration system operates to control superheat with the at least one expansion valve when a rotational velocity of the compressor exceeds a set rotational velocity and a temperature of fluid cooled by the at least one evaporator is greater than a set temperature; or
the refrigeration system operates to control superheat with the at least one expansion valve when operation of the system to control the at least one expansion valve to control superheat at the inlet of the compressor has been specified by a logic operational state in response to a sensed condition of operation of the refrigeration system; or
the refrigeration system operates to control superheat with the at least one expansion valve when a motor control controlling a rotational velocity of the compressor draws current exceeding a maximum current which may be drawn during operation which causes the motor control to command a reduced rotational velocity.

35. A method in accordance with claim 31 wherein:
a rotational velocity of the compressor is controlled to maintain the controlled superheat when the opening of the at least one expansion valve is controlled to maintain the cooled fluid at the set temperature.

36. A method in accordance with claim 32 wherein:

a rotational velocity of the compressor is controlled to maintain the controlled superheat when the opening of the at least one expansion valve is controlled to maintain the cooled fluid at the set temperature.

37. A method in accordance with claim 33 wherein: a rotational velocity of the compressor is controlled to maintain the controlled superheat when the opening of the at least one expansion valve is controlled to maintain the cooled fluid at the set temperature.

38. A method in accordance with claim 34 wherein: a rotational velocity of the compressor is controlled to maintain the controlled superheat when the opening of the at least one expansion valve is controlled to maintain the cooled fluid at the set temperature.

* * * * *